(12) United States Patent
Weissbrodt et al.

(10) Patent No.: US 12,440,435 B2
(45) Date of Patent: Oct. 14, 2025

(54) SOLUBILIZATION OF POORLY SOLUBLE COOLING SUBSTANCES

(71) Applicant: SYMRISE AG, Holzminden (DE)

(72) Inventors: Jenny Weissbrodt, Holzminden (DE); Michael Backes, Holzminden (DE); Rita Lages, Bodenwerder (DE); Olga Pauli, Holzminden (DE)

(73) Assignee: SYMRISE AG, Holzminden (DE)

( * ) Notice: Subject to any disclaimer, the term of this patent is extended or adjusted under 35 U.S.C. 154(b) by 653 days.

(21) Appl. No.: 17/257,898

(22) PCT Filed: Jul. 6, 2018

(86) PCT No.: PCT/EP2018/068365
§ 371 (c)(1),
(2) Date: Jan. 5, 2021

(87) PCT Pub. No.: WO2020/007484
PCT Pub. Date: Jan. 9, 2020

(65) Prior Publication Data
US 2021/0267864 A1    Sep. 2, 2021

(51) Int. Cl.
*A61K 8/42* (2006.01)
*A61K 8/11* (2006.01)
*A61K 8/37* (2006.01)
*A61Q 11/00* (2006.01)
*B01J 13/04* (2006.01)

(52) U.S. Cl.
CPC .................. *A61K 8/42* (2013.01); *A61K 8/11* (2013.01); *A61K 8/37* (2013.01); *A61K 8/375* (2013.01); *A61Q 11/00* (2013.01); *B01J 13/043* (2013.01)

(58) Field of Classification Search
CPC ........ B01J 13/043; A61K 8/0241; A61K 8/37; A61K 8/345; A61K 8/11; A61K 8/42; A61K 2800/244; A61Q 19/001; A61Q 11/00
See application file for complete search history.

(56) References Cited

FOREIGN PATENT DOCUMENTS

| CN | 107890074 A | | 4/2018 |
|---|---|---|---|
| EP | 2186506 A1 | | 5/2010 |
| EP | 2960235 | * | 12/2015 |
| JP | 2016023284 | * | 2/2016 |
| JP | 2016023284 A | * | 2/2016 |
| WO | WO 2011159935 | * | 12/2011 |
| WO | 2017165882 A1 | | 9/2017 |
| WO | 2018028770 A1 | | 2/2018 |

OTHER PUBLICATIONS

International Search Report and Written Opinion issued on Mar. 29, 2019 for corresponding PCT Application No. PCT/EP2018/068365.

* cited by examiner

*Primary Examiner* — Lezah Roberts
(74) *Attorney, Agent, or Firm* — POLSINELLI PC

(57) ABSTRACT

The present invention relates to a cooling composition for producing cooling particles comprising a solvent component and dissolved therein (1R,2S,5R)-N-(4-methoxyphenyl)-5-methyl-2-(1-methylethyl)-cyclohexane-carboxamide. The present invention further relates to cooling particles comprising a cooling composition according to the invention, oral preparations comprising cooling particles, new uses of cooling particles, a process for the production of cooling particles as well as the use of a solvent component for dissolving cooling agents.

20 Claims, No Drawings

SOLUBILIZATION OF POORLY SOLUBLE COOLING SUBSTANCES

CROSS-REFERENCE TO RELATED APPLICATIONS

This application is a national stage application (under 35 U.S.C. § 371) of PCT/EP2018/068365, filed Jul. 6, 2018, which is incorporated herein by reference in its entirety.

The present invention relates to a cooling composition for producing cooling particles comprising a solvent component and dissolved therein (1R,2S,5R)-N-(4-methoxyphenyl)-5-methyl-2-(1-methylethyl)cyclohexane-carboxamide. The present invention further relates to cooling particles comprising a cooling composition according to the invention. Furthermore, the present invention relates to oral preparations comprising cooling particles as well as the use of cooling particles. Finally, the present invention also provides a process for producing cooling particles and a use of a solvent component for dissolving cooling agents is described.

From the state of the art, processes for the production of cooling particles are described. In EP 2 801 263 A1 a cooling composition is encapsulated in a spray granulation process. The cooling composition used in the process comprises a cooling agent and at least one hydrophobic compound and optionally an alcohol. Before the spray granulation process, the components of the cooling composition are dissolved at an elevated temperature of up to 100° C. and kept at elevated temperatures of 35° C. to 65° C. until further processing in order to prevent recrystallisation of the components, in particular of the cooling agent.

The process described in the state of the art has the disadvantage that the used cooling composition is not storage stable and has to be kept at elevated temperature until it is used. In order to keep the composition at this elevated temperature, special equipment is required to keep the used educts warm. On the other hand, a lot of energy is consumed in heating and keeping the composition warm, which leads to an increase in production costs.

Another disadvantage of the process described in the state of the art is that the necessary keeping warm of the dissolved composition makes it impossible or extremely difficult to transport the produced composition, so that the dissolving process and the subsequent use of the composition must take place at the same place. Filling the dissolved composition into drums with subsequent transport or storage at normal outside temperatures, possibly even at low temperatures in winter, is not possible with the compositions described in the state of the art so far.

Since storage or transport of the composition is not possible without permanent heating and the dissolving or production of the composition had to be carried out at the place of further processing first, it is necessary to divide the individual components of the composition known in the state of the art into different components which were mixed under heating before dissolving and thus producing the composition.

The objective of the present invention was to provide cooling compositions which do not have the above mentioned disadvantages of already known cooling compositions. In particular, the objective of the present invention was to provide cooling compositions which fulfil at least one of the following requirements, namely
   can be stored at usual temperatures in a production hall in the range of 15 to 30° C. without additional heating of the composition
   and
   can be transported without special precautions, without individual components of the composition crystallising.

The objective is solved according to the invention by a cooling composition for the production of cooling particles consisting of or comprising
   (A) a solvent component consisting of or comprising
      i) 2-hydroxypropyl (2-isopropyl-5-methyl-cyclohexyl) carbonate
      and/or
      ii) (2-isopropyl-5-methyl-cyclohexyl) 2-hydroxypropanoate
   and dissolved therein
   (B) 0.5 to 12% by weight of (1R,2S,5R)-N-(4-methoxyphenyl)-5-methyl-2-(1-methylethyl)-cyclohexane-carboxamide (CAS number 68489-09-8; FEMA number 4681) as cooling agent, based on the total weight of the composition.

Surprisingly, it has been shown that the cooling agent (1R,2S,5R)-N-(4-methoxyphenyl)-5-methyl-2-(1-methylethyl)-cyclohexane-carboxamide can be dissolved in 2-hydroxypropyl (2-isopropyl-5-methyl-cyclohexyl) carbonate, (2-isopropyl-5-methyl-cyclohexyl) 2-hydroxypropanoate or a mixture of both compounds and that the resulting solution also is storage stable at temperatures of 25° C. and less for days and weeks. This is particularly surprising since (2-isopropyl-5-methyl-cyclohexyl) 2-hydroxypropanoate is a solid with a melting point of about 40° C. Amounts of up to 12% by weight of the cooling agent, based on the total weight of the composition, can be dissolved.

In an embodiment of the present invention, the composition additionally contains N-ethyl-2-isopropyl-5-methyl-cyclohexanecarboxamide. Own studies have shown that N-ethyl-2-isopropyl-5-methyl-cyclohexanecarboxamide, which is also a solid, is not capable of dissolving the cooling agent or to crystallise the melts of N-ethyl-2-isopropyl-5-methyl-cyclohexanecarboxamide and the cooling agent obtained by heating on cooling. However, the addition of N-ethyl-2-isopropyl-5-methyl-cyclohexanecarboxamide can stabilise the compositions according to the invention so that crystallisation does not occur. This is particularly surprising in this respect, since the skilled person would expect that the addition of further solids would reduce the maximum solubility of other solids and thus rather promote crystallisation of already dissolved solids. This effect known to the skilled person is used, for example, in the case of salting out, in which water-soluble substances are displaced from the aqueous phase by the addition of salt.

In the present invention, the N-ethyl-2-isopropyl-5-methyl-cyclohexanecarboxamide is assigned to group (A), i.e. the solvent component, even though this compound itself is not suitable for dissolving (1R,2S,5R)-N-(4-methoxyphenyl)-5-methyl-2-(1-methylethyl)-cyclohexane-carboxamide over a long period of time without the addition of further compounds. In the present case, it serves as a solution stabiliser and improves the dissolving ability of all solvent components with respect to the solubility of (1R,2S,5R)-N-(4-methoxyphenyl)-5-methyl-2-(1-methylethyl)-cyclohexane-carboxamide.

According to the invention, cooling compositions are thus particularly preferred for the production of cooling particles which
   (A) a solvent component consisting of or comprising
      i) 2-hydroxypropyl (2-isopropyl-5-methyl-cyclohexyl) carbonate and ii) (2-isopropyl-5-methyl-cyclohexyl) 2-hydroxypropanoate
and
iii) N-ethyl-2-isopropyl-5-methyl-cyclohexanecarboxamide
and dissolved therein
(B) 0.5 to 12% by weight of (1R,2S,5R)-N-(4-methoxyphenyl)-5-methyl-2-(1-methylethyl)-cyclohexane-carboxamide (CAS number 68489-09-8; FEMA number 4681) as cooling agent, based on the total weight of the composition.

Own studies have entirely surprisingly shown that the combination of 2-hydroxypropyl (2-isopropyl-5-methyl-cyclohexyl) carbonate, (2-isopropyl-5-methyl-cyclohexyl) 2-hydroxypropanoate and N-ethyl-2-isopropyl-5-methyl-cyclohexanecarboxamide is particularly suitable to dissolve (1R,2S,5R)-N-(4-methoxyphenyl)-5-methyl-2-(1-methylethyl)-cyclohexane-carboxamide and that the resulting solutions remain stable for a particularly long time at temperatures of 25° C. and lower without individual components crystallising out.

Cooling compositions are preferred according to the invention, wherein N-ethyl-2-isopropyl-5-methyl-cyclohexanecarboxamide is (1R,2S,5R)-N-ethyl-2-isopropyl-5-methyl-cyclohexanecarboxamide (CAS number 68489-00-9).

Cooling compositions are preferred according to the invention, wherein 2-hydroxypropyl (2-isopropyl-5-methyl-cyclohexyl) carbonate is 2-hydroxypropyl [(1R,2S,5R)-2-isopropyl-5-methyl-cyclohexyl] carbonate (CAS number 260781-16-6).

Surprisingly, our own studies have shown that the diastereomer of the compound used according to the invention described herein exhibits good properties with respect to the solubility of (1R,2S,5R)-N-(4-methoxyphenyl)-5-methyl-2-(1-methylethyl)-cyclohexane-carboxamide.

Cooling compositions are preferred according to the invention, wherein (2-isopropyl-5-methyl-cyclohexyl) 2-hydroxypropanoate is [(1R,2S,5R)-2-isopropyl-5-methyl-cyclohexyl] (2S)-2-hydroxypropanoate (CAS number 61597-98-6).

Surprisingly, our own studies have shown that the diastereomer of the compound used according to the invention described herein exhibits good properties with respect to the solubility of (1R,2S,5R)-N-(4-methoxyphenyl)-5-methyl-2-(1-methylethyl)-cyclohexane-carboxamide.

According to the invention, it is particularly preferred if the N-ethyl-2-isopropyl-5-methyl-cyclohexanecarboxamide used is (1R,2S,5R)-N-ethyl-2-isopropyl-5-methyl-cyclohexanecarboxamide (CAS number 68489-00-9), the 2-hydroxypropyl (2-isopropyl-5-methyl-cyclohexyl) carbonate used is 2-hydroxypropyl [(1R,2S,5R)-2-isopropyl-5-methyl-cyclohexyl] carbonate (CAS number 260781-16-6) and the (2-isopropyl-5-methyl-cyclohexyl) 2-hydroxypropanoate used is [(1R,2S,5R)-2-isopropyl-5-methyl-cyclohexyl] (2S)-2-hydroxypropanoate (CAS number 61597-98-6).

Own studies have surprisingly shown that the combination of the three described diastereomers of the compound used according to the invention leads to excellent properties regarding the solubility of (1R,2S,5R)-N-(4-methoxyphenyl)-5-methyl-2-(1-methylethyl)-cyclohexane-carboxamide.

The diastereomers of the solvent components described above have proven to be particularly advantageous, since they not only lead to an excellent solubilisation of the (1R,2S,5R)-N-(4-methoxyphenyl)-5-methyl-2-(1-methylethyl)-cyclohexane-carboxamide, but additionally have a cooling effect, thus further improving the cooling effect of the composition according to the invention.

Cooling compositions are preferred according to the invention, wherein the solvent component
comprises 2 to 20% by weight, preferably 4 to 15% by weight, more preferably 6.4 to 11.8% by weight of 2-hydroxypropyl (2-isopropyl-5-methyl-cyclohexyl) carbonate,
and/or
comprises 55 to 75% by weight, preferably 60 to 70% by weight, more preferably 63 to 67% by weight of (2-isopropyl-5-methyl-cyclohexyl) 2-hydroxypropanoate
and/or
comprises 15 to 35% by weight, preferably 20 to 30% by weight, more preferably 23 to 27% by weight of N-ethyl-2-isopropyl-5-methyl-cyclohexanecarboxamide,
based on the total weight of the solvent component, respectively.

A cooling composition according to the invention is preferred, wherein the composition contains 88 to 99.5% by weight, preferably 90 to 94% by weight of the solvent component (A), based on the total weight of the composition.

A cooling composition according to the invention is preferred, wherein the composition additionally contains 0.5 to 8% by weight, preferably 4 to 7.5% by weight, more preferably 5 to 7% by weight of medium-chain triglycerides, based on the total weight of the composition.

Own studies have surprisingly shown that the addition of medium-chain triglycerides can further improve the stability of (1R,2S,5R)-N-(4-methoxyphenyl)-5-methyl-2-(1-methylethyl)-cyclohexane-carboxamide in solution. This result is surprising in view of the fact that medium-chain triglycerides are considered to be poor solvents for (1R,2S,5R)-N-(4-methoxyphenyl)-5-methyl-2-(1-methylethyl)-cyclohexane-carboxamide. If a poor solvent is added, the skilled person would expect the dissolved substance to crystallise out of the solution. Surprisingly, this is not the case in the present case. Up to a proportion of 8% by weight, the medium-chain triglyceride stabilises the solution.

Medium-chain triglycerides (MCTs) or MCT fats are triglycerides containing medium-chain fatty acids. Medium-chain fatty acids include caproic acid (C 6:0), caprylic acid (C 8:0), capric acid (C 10:0) and lauric acid (C 12:0). These are saturated fatty acids, which are mainly found in tropical vegetable fats such as coconut fat (approx. 60%) and palm kernel oil (approx. 55%) and in butter. To a small extent, they are also contained in milk fat (approx. 10%). Medium-chain triglycerides are obtained industrially by hydrolysis of coconut fat and palm kernel oil, fractionation of the medium-chain fatty acids and subsequent esterification with glycerin. A pure medium-chain triglyceride is colourless to yellowish, neutral in odour and taste and of very low viscosity.

According to the invention, a medium-chain triglyceride preferably exhibits 50-80% caprylic acid C8, 25-45% capric acid C10, lauric acid max. 3% and max. 2% caproic acid.

A cooling composition according to the invention is preferred, wherein the composition contains more than 50% by weight, preferably more than 65% by weight, more preferably more than 80% by weight of the solvent component (A), based on the total weight of the composition.

A cooling composition according to the invention is particularly preferred, wherein the composition contains 80 to 99% by weight, preferably 80.5 to 95.5% by weight, more preferably 81 to 94.5% by weight of the solvent component (A), based on the total weight of the composition.

A cooling composition according to the invention is particularly preferred, wherein the composition comprises 0.5 to 6% by weight, preferably 1 to 4% by weight, more preferably 1.5 to 3% by weight (1R,2S,5R)-N-(4-methoxyphenyl)-5-methyl-2-(1-methylethyl)-cyclohexane-carboxamide (FEMA 4681) as cooling agent, based on the total weight of the composition, respectively.

Cooling compositions according to the invention with a proportion of 0.5 to 6% by weight of cooling agent are particularly preferred if the cooling composition is to be used directly in liquid semi-finished products or finished products.

A cooling composition according to the invention is particularly preferred, wherein the composition comprises 6 to 12% by weight, preferably 6.5 to 10% by weight, more preferably 7 to 9% by weight (1R,2S,5R)-N-(4-methoxyphenyl)-5-methyl-2-(1-methylethyl)-cyclohexane-carboxamide (FEMA 4681) as cooling agent, based on the total weight of the composition, respectively.

Cooling compositions according to the invention with a proportion of 6 to 12% by weight of cooling agent are particularly preferred if the cooling composition is to be used for the production of cooling particles or in solid semi-finished products or finished products.

According to the invention, cooling compositions for producing cooling particles are thus particularly preferred, which comprise
(A) a solvent component consisting of or comprising
  i) 2 to 20% by weight, preferably 4 to 15% by weight, more preferably 6.4 to 11.8% by weight of 2-hydroxypropyl [(1R,2S,5R)-2-isopropyl-5-methyl-cyclohexyl] carbonate (CAS number 260781-16-6)
  and
  ii) 55 to 75% by weight, preferably 60 to 70% by weight, more preferably 63 to 67% by weight of [(1R,2S,5R)-2-isopropyl-5-methyl-cyclohexyl] (2S)-2-hydroxypropanoate (CAS number 61597-98-6)
  and
  iii) 15 to 35% by weight, preferably 20 to 30% by weight, more preferably 23 to 27% by weight of (1R,2S,5R)-N-ethyl-2-isopropyl-5-methyl-cyclohexanecarboxamide (CAS number 68489-00-9),
  based on the total weight of the solvent component, respectively,
  and dissolved therein
(B) 0.5 to 12% by weight of (1R,2S,5R)-N-(4-methoxyphenyl)-5-methyl-2-(1-methylethyl)-cyclohexane-carboxamide (CAS number 68489-09-8; FEMA number 4681) as cooling agent, based on the total weight of the composition,
and wherein the composition contains more than 50% by weight, preferably more than 65% by weight, more preferably more than 80% by weight of the solvent component (A), based on the total weight of the composition.

According to the invention, cooling compositions for the production of cooling particles are thus also particularly preferred, which comprise
(A) a solvent component consisting of or comprising
  i) 2 to 20% by weight, preferably 4 to 15% by weight, more preferably 6.4 to 11.8% by weight of 2-hydroxypropyl [(1R,2S,5R)-2-isopropyl-5-methyl-cyclohexyl] carbonate (CAS number 260781-16-6)
  and
  ii) 55 to 75% by weight, preferably 60 to 70% by weight, more preferably 63 to 67% by weight of [(1R,2S,5R)-2-isopropyl-5-methyl-cyclohexyl] (2S)-2-hydroxypropanoate (CAS number 61597-98-6)
  and
  iii) 15 to 35% by weight, preferably 20 to 30% by weight, more preferably from 23 to 27% by weight of (1R,2S,5R)-N-ethyl-2-isopropyl-5-methyl-cyclohexanecarboxamide (CAS number 68489-00-9),
  based on the total weight of the solvent component, respectively,
  and dissolved therein
(B) 0.5 to 12% by weight of (1R,2S,5R)-N-(4-methoxyphenyl)-5-methyl-2-(1-methylethyl)-cyclohexane-carboxamide (CAS number 68489-09-8; FEMA number 4681) as cooling agent, based on the total weight of the composition,
and wherein the composition additionally contains 0.5 to 8% by weight, preferably 4 to 7.5% by weight, more preferably 5 to 7% by weight of medium-chain triglycerides, based on the total weight of the composition,
wherein the composition contains more than 50% by weight, preferably more than 65% by weight, more preferably more than 80% by weight of the solvent component (A), based on the total weight of the composition.

Although the addition of other solvents, such as alcohols, to the cooling compositions according to the invention is not excluded, this is not necessary for the solubilisation of the (1R,2S,5R)-N-(4-methoxyphenyl)-5-methyl-2-(1-methylethyl)-cyclohexane-carboxamide. According to the invention, it is preferred if the cooling compositions do not contain any alcohols such for example as methanol, ethanol, propanol, 1,2-propanediol.

Another aspect of the present invention relates to cooling particles comprising a cooling composition according to the invention.

It has been shown in own studies that cooling particles according to the invention impart a stronger feeling of freshness due to a physiological cooling effect of the cooling agent than cooling particles, which have the same amount of cooling agent but a different composition of the solvent component. Due to the very good solubility of the cooling agent in the solvent component used according to the invention, the cooling agent does not crystallise in the particle. During oral intake of the cooling particles, the cooling agent is thus already present in dissolved form and can therefore be distributed in the mouth much better than if it were present as a crystalline solid. Accordingly, this leads to a stronger feeling of freshness.

However, this effect is not only observed with cooling particles according to the invention, but also with the oral intake of compositions according to the invention in general.

The cooling particles according to the invention can preferably be matrix particles or granules, for example obtained by spray drying or spray granulation, or core-shell particles.

Cooling particles with an average particle diameter D50 in the range of 10 to 2000 μm are preferred according to the invention.

Provided that the particles according to the invention are matrix particles that were obtained by spray drying, the average particle diameter D50 is preferably in the range of 10 to 200 μm, more preferably in the range of 15 to 150 μm, particularly preferably in the range of 50 to 100 μm.

Provided that the particles according to the invention are granules that were obtained by spray granulation, the average particle diameter D50 is preferably in the range of 200 to 2000 μm, more preferably in the range of 250 to 1500 μm, particularly preferably in the range of 300 to 900 μm.

The average particle diameter D50 is determined by laser light diffraction according to ISO13320:2009-10.

Cooling particles according to the invention are preferred, wherein the particles contain or consist of compounds as matrix materials or shell materials selected from the group consisting of starch, starch derivatives (e.g. modified starch), celluloses or cellulose derivatives (e.g. hydroxypropyl cellulose), other polysaccharides (e.g. pectin, dextrin, alginate, curdlan, carageenan, chitin, chitosan, pullulan, gum arabic), natural fats, natural waxes (e.g. beeswax, carnauba wax), proteins, e.g. gelatin and other natural products (e.g. shellac).

Cooling particles according to the invention are preferred, wherein the cooling particles comprise 5 to 40% by weight, preferably 10 to 30% by weight of the cooling composition according to the invention, based on the total weight of the particles.

A further aspect of the present invention relates to an oral preparation comprising cooling particles according to the invention or a composition according to the invention.

An oral preparation according to the invention is preferred, wherein the oral preparation is a beverage, a chewing gum, a mouthwash, toothpaste, lip balm or a candy.

An oral preparation according to the invention is preferred, comprising a) 5 to 95% by weight of chewing gum base, b) 5 to 95% by weight of fillers and sweeteners, c) 0.1 to 15% by weight of flavours, d) 0.2 to 4% by weight of cooling particles according to the invention.

A further aspect of the present invention relates to the use of cooling particles according to the invention or a cooling composition according to the invention to impart a feeling of freshness in oral preparations by means of a physiologically cooling effect.

A further aspect of the present invention relates to a use of a composition according to the invention in an encapsulation process, preferably a spray drying or spray granulation.

Another aspect of the present invention relates to a process for producing cooling particles comprising the following steps:
  Producing or providing a composition according to the invention,
  storage of the produced or provided composition,
  producing or providing matrix materials,
  if applicable, mixing of the produced or provided composition with the produced or provided matrix materials,
  carrying out an encapsulation process resulting in cooling particles in which the composition is encased by the matrix materials.

According to the invention, a process is preferred, wherein the encapsulation process is spray drying, spray granulation, melt granulation, coacervation, coagulation, extrusion, melt extrusion, emulsion process, coating or other suitable encapsulation process, preferably is spray drying or spray granulation.

A process according to the invention is preferred, wherein the matrix materials are starch, starch derivatives (e.g. modified starch), cellulose or cellulose derivatives (e.g. hydroxypropyl cellulose), other polysaccharides (e.g. pectin, dextrin, alginate, curdlan, carageenan, chitin, chitosan, pullulan, gum arabic), natural fats, natural waxes (e.g. beeswax, carnauba wax), proteins, e.g. gelatin and/or other natural products (e.g. shellac).

A process according to the invention is preferred, wherein the storage of the produced or provided composition takes place at a temperature below 40° C., preferably below 35° C., particularly preferably below 30° C., further preferably below 25° C. In some embodiments of the present invention it is preferred if the storage of the produced or provided composition takes place at a temperature in the range of 0° C. to 25° C., preferably in the range of 5° C. to 15° C.

A process according to the invention is preferred, wherein the storage of the produced or provided composition takes place at a temperature between 5° C. and 65° C., preferably between 18° C. and 35° C., particularly preferably between 2° and 25° C.

A process according to the invention is preferred, wherein the storage of the produced or provided composition takes place without the supply of thermal energy.

A process according to the invention is preferred, wherein the cooling particles obtained have an average particle diameter D50 in the range of 10 to 2000 μm.

A further aspect of the present invention relates to a use of a solvent component consisting of or comprising
  i) 2-hydroxypropyl (2-isopropyl-5-methyl-cyclohexyl) carbonate and/or
  ii) (2-isopropyl-5-methyl-cyclohexyl) 2-hydroxypropanoate for dissolving one or more cooling agents.

Own studies have surprisingly shown that the solvent component used in the composition according to the invention is also suitable for dissolving other cooling agents.

A use according to the invention is preferred, wherein the cooling agent, at least one of the plurality of cooling agents or all of the plurality of cooling agents are cooling agents selected from the group comprising (1R,2S,5R)-N-(4-methoxyphenyl)-5-methyl-2-(1-methylethyl)-cyclohexane-carboxamide (FEMA GRAS 4681), menthol methyl ether (FEMA GRAS 4054), menthoxyethanol (FEMA GRAS 4154), menthone glyceryl acetal (FEMA GRAS 3807 and 3808), mentholethylene glycol carbonate (FEMA GRAS 3805), menthyl N-ethyloxamate, monomethylsuccinate (FEMA GRAS 3810), monomenthyl glutarate (FEMA GRAS 4006), menthoxy-1,2-propanediol (FEMA GRAS 3784), menthoxy-2-methyl-1,2-propanediol (FEMA GRAS 3849), isopropyltrimethylbutyramide (WS-23, FEMA GRAS 3804), N-((ethoxycarbonyl)methyl)-p-menthyl-3-carboxamide (WS-5, FEMA GRAS 4309), diethylhydroxydimethylethylbutanamide (WS-116, FEMA GRAS 4603), ethyldiisopropyl butanamide (WS-27, FEMA GRAS 4557), cyclopropylmenthylcarboxamide (FEMA GRAS 4693), mentholethylene glycol carbonate (FEMA GRAS 3805), menthanediol (FEMA GRAS 4053), menthylpyrrolidone carboxylate (FEMA GRAS 4155), dimethylmenthylsuccinamide (FEMA GRAS 4230), 3,9-dimethyl-6-(1-methylethyl)-1,4-dioxaspiro[4.5]decan-2-one (FEMA GRAS 4285), menthyl hydroxybutyrate (FEMA GRAS 4308), menthyl acetoacetate (FEMA GRAS 4327), N-(4-cyanomethylphenyl)-p-menthylcarboxamide (FEMA GRAS 4496), N-(2-pyridin-2-ylethyl) menthylcarboxamide (FEMA GRAS 4549), N-hydroxyethyldimethyl-isopropylbutanamide (FEMA GRAS 4602), dimenthylglutarate (FEMA GRAS 4604), N-[4-(2-amino-2-oxoethyl)phenyl]-p-menthylcarboxamide (FEMA GRAS 4684), menthoxyethoxyethanol (FEMA GRAS 4718), hydroxymethylcyclohexylethanone (FEMA GRAS 4742), 2-(4-methylphenoxy)-N-(1H-pyrazol-3-yl)-N-(thiophen-2-ylmethyl) acetamide (FEMA GRAS 4809), 2-(4-ethylphenoxy)-N-(1H-pyrazol- 3-yl)-N-(thiophen-2-ylmethyl) acetamide (FEMA GRAS 4880), N-(3-hydroxy-4-methoxyphenyl)-2-isopropyl-5,5-dimethylcyclohexane carboxamide (FEMA GRAS 4881), N-(4-(cyanomethyl)phenyl)-2-isopropyl-5,5-dimethylcyclohexane carboxamide (FEMA GRAS 4882), N-(2-hydroxy-2-phenylethyl)-2-isopropyl-5,5-dimethylcyclohexane-1-carboxamide (FEMA GRAS 4896) and (E)-3-benzo[1,3]dioxol-5-yl-N,N-diphenyl-2-propenamide (FEMA GRAS 4788).

Within the scope of the present invention, preferably several of the aspects designated above as preferred are realized simultaneously; in particular, the combinations of such aspects and the corresponding features resulting from the attached claims are preferred.

EXAMPLES

Example 1

96 g of 2-hydroxypropyl (2-isopropyl-5-methyl-cyclohexyl) carbonate were put in a 250 ml beaker and 4 g of (1R,2S,5R)-N-(4-methoxyphenyl)-5-methyl-2-(1-methylethyl)-cyclohexane-carboxamide were added. The mixture was stirred and heated in 20° C. steps until a clear solution was formed. After each heating by 20° C., the solution was stirred for at least 20 minutes. Afterwards the mixture was cooled down to a room temperature of about 25° C. The produced solution was stable for 8 hours even after cooling and no crystals were formed.

Example 2

Example 1 was repeated, but instead of 2-hydroxypropyl (2-isopropyl-5-methyl-cyclohexyl) carbonate (2-isopropyl-5-methyl-cyclohexyl) 2-hydroxypropanoate was used as solvent. The produced solution was stable even after cooling and no crystals were formed.

Example 3

Example 1 was repeated, but instead of 2-hydroxypropyl (2-isopropyl-5-methyl-cyclohexyl) carbonate a mixture of 2-hydroxypropyl (2-isopropyl-5-methyl-cyclohexyl) carbonate and (2-isopropyl-5-methyl-cyclohexyl) 2-hydroxypropanoate was used as solvent. The produced solution was stable even after cooling and no crystals were formed.

Example 4

Example 1 was repeated, but instead of 2-hydroxypropyl (2-isopropyl-5-methyl-cyclohexyl) carbonate a mixture of 2-hydroxypropyl (2-isopropyl-5-methyl-cyclohexyl) carbonate, (2-isopropyl-5-methyl-cyclohexyl) 2-hydroxypropanoate and N-ethyl-2-isopropyl-5-methyl-cyclohexanecarboxamide was used as solvent and 10 g of (1R,2S,5R)-N-(4-methoxyphenyl)-5-methyl-2-(1-methylethyl)-cyclohexanecarboxamide were dissolved. The produced solution was stable even after cooling and crystals were formed only after more than 24 hours.

Example 5

Example 4 was repeated, but 8 g of (1R,2S,5R)-N-(4-methoxyphenyl)-5-methyl-2-(1-methylethyl)-cyclohexane-carboxamide were dissolved. The produced solution was stable for more than 24 hours even after cooling and no crystals were formed.

Example 6

Example 4 was repeated, but 6 g of (1R,2S,5R)-N-(4-methoxyphenyl)-5-methyl-2-(1-methylethyl)-cyclohexane-carboxamide were dissolved. The produced solution was stable for more than 24 hours even after cooling and no crystals were formed.

Example 7

Example 4 was repeated, but 4 g of (1R,2S,5R)-N-(4-methoxyphenyl)-5-methyl-2-(1-methylethyl)-cyclohexane-carboxamide were dissolved. The produced solution was stable for more than two weeks even after cooling and no crystals were formed.

Example 8

Example 1 repeated, but instead of 2-hydroxypropyl (2-isopropyl-5-methyl-cyclohexyl) carbonate a mixture of 2-hydroxypropyl (2-isopropyl-5-methyl-cyclohexyl) carbonate, (2-isopropyl-5-methyl-cyclohexyl) 2-hydroxypropanoate, N-ethyl-2-isopropyl-5-methyl-cyclohexanecarboxamide and 6% by weight of medium-chain triglycerides were used as solvents and 6 g of (1R,2S,5R)-N-(4-methoxyphenyl)-5-methyl-2-(1-methylethyl)-cyclohexane-carboxamide were dissolved. The produced solution was stable for more than two weeks even after cooling and no crystals were formed.

Example 9: Production of Granular Particles with a Cooling Composition According to the Invention by Spray Granulation A cooling composition according to invention from example 8 was produced and stored at approx. 20° C. A mixture of 50 parts by weight of modified starch, 25 parts by weight of gum arabic (Senegal) and 10 parts by weight of mannitol as carrier component was then provided. The cooling composition and the carrier component were mixed in a weight ratio of 1 to 4 and spray granulated.

Cooling particles with an average particle diameter D50 of 600 µm, determined by laser light diffraction according to ISO ISO13320:2009-10, are obtained, which comprise approx. 20% by weight of the cooling composition according to the invention.

By varying the process parameters of the spray granulation process, it is also possible to produce particles with a size of, for example, 200 µm, 300 µm, 400 µm, 800 µm, 1400 µm, 1800 µm or 2000 µm.

Example 10: Production of Particles with a Cooling Composition According to the Invention by Spray Drying A cooling composition according to invention from example 8 was produced and stored at approx. 20° C. A mixture of 60 parts by weight of modified starch, 25 parts by weight of gum arabic (Senegal) and 10 parts by weight of sugar alcohol as carrier component was then provided. The cooling composition and the carrier component were mixed in a weight ratio of 3 to 7 and spray dried.

Cooling particles with an average particle diameter D50 of 80 µm, determined by laser light diffraction according to ISO ISO13320:2009-10, are obtained, comprising approximately 27% by weight of the cooling composition according to the invention.

By varying the process parameters of the spray drying process, it is also possible to produce particles with a size of, for example, 10 μm, 20 μm, 75 μm, 125 μm, 150 μm, 175 μm or 200 μm.

Example 11: Production of a Mouthwash

| Part | Ingredient | Use in % by weight |
|---|---|---|
| A | Ethanol | 10.00 |
|  | Cremophor ® CO 40 (BASF, detergent) | 1.00 |
|  | Benzoic acid | 0.12 |
|  | Solution of example 8 | 1.00 |
| B | Demineralised water | 82.71 |
|  | Sorbitol, 70% | 5.00 |
|  | Sodium saccharin 450 | 0.07 |
|  | L-Blue 5000 e.c., 1% in water (dye) | 0.10 |

The ingredients of parts A and B were each mixed separately. Part B was slowly stirred into part A until the mixture was homogeneous.

When using the mouthwash produced in this way, a very high cooling effect was observed.

Example 12: Production of a Sugar-Free Chewing Gum

| Part | Ingredient | Use in % by weight |
|---|---|---|
| A | Chewing gum base, Company "Jagum T" | 30.00 |
| B | Sorbitol, powdered | 39.00 |
|  | Isomalt ® (Palatinit GmbH) | 9.50 |
|  | Xylitol | 2.00 |
|  | Mannitol | 3.00 |
|  | Aspartame ® | 0.10 |
|  | Acesulfam ® K | 0.10 |
|  | Emulgum ® (Colloides Naturels, Inc.) | 0.30 |
| C | Sorbitol, 70% | 14.00 |
|  | Glycerin | 1.00 |
| D | Granules of example 9 | 1.00 |

Parts A to D were mixed and intensively kneaded. The raw mass was processed e.g. in the form of thin strips into ready-to-eat chewing gums.

When using the chewing gum produced in this way, a considerable cooling effect was observed.

Comparative Example 1

Example 1 was repeated, but instead of 2-hydroxypropyl (2-isopropyl-5-methyl-cyclohexyl) carbonate ethanol was used as solvent. The produced solution crystallised already during cooling to room temperature.

Comparative Example 2

Example 1 was repeated, but instead of 2-hydroxypropyl (2-isopropyl-5-methyl-cyclohexyl) carbonate medium-chain triglycerides were used as solvent and 1 g of (1R,2S,5R)-N-(4-methoxyphenyl)-5-methyl-2-(1-methylethyl)-cyclohexane-carboxamide was dissolved. (1R,2S,5R)-N-(4-methoxyphenyl)-5-methyl-2-(1-methylethyl)-cyclohexane-carboxamide is insoluble in medium-chain triglycerides even at 60° C.

Comparative Example 3

Example 1 was repeated, but instead of 2-hydroxypropyl (2-isopropyl-5-methyl-cyclohexyl) carbonate N-ethyl-2-isopropyl-5-methyl-cyclohexanecarboxamide was used as solvent, 1 g of (1R,2S,5R)-N-(4-methoxyphenyl)-5-methyl-2-(1-methylethyl)-cyclohexane-carboxamide was dissolved and the mixture was heated until both substances were melted. Both substances crystallised during cooling.

The invention claimed is:

1. Cooling particles comprising:
   (I) 5 to 40% by weight, based on a total weight of the cooling particles, of a cooling composition, the cooling composition comprising:
      (A) 80 to 99% by weight, based on a total weight of the cooling composition, of a solvent component consisting of:
         (i) 2-hydroxypropyl (2-isopropyl-5-methyl-cyclohexyl) carbonate and/or (2-isopropyl-5-methyl-cyclohexyl) 2-hydroxypropanoate;
         (ii) optionally, N-ethyl-2-isopropyl-5-methyl-cyclohexanecarboxamide; and
         (iv) optionally, 0.5 to 8% by weight, based on a total weight of the solvent component, of medium-chain triglycerides; and
      (B) 0.5 to 12% by weight, based on a total weight of the cooling composition, of a cooling agent that is (1R,2S,5R)-N-(4-methoxyphenyl)-5-methyl-2-(1-methylethyl)-cyclohexane-carboxamide,
         wherein the cooling agent (B) is dissolved in the solvent component (A) at room temperature; and
   (II) a matrix material that encapsulates the cooling composition (I),
      wherein the particles have an average particle diameter D50 of 10 to 2000 μm as determined by laser light diffraction according to ISO ISO13320:2009-10.

2. The cooling particles of claim 1, wherein the matrix material comprises starch; starch derivatives; cellulose; cellulose derivatives; polysaccharides other than cellulose, cellulose derivatives, starch, and starch derivatives; natural fats; natural waxes; proteins; or a combination thereof.

3. The cooling particles of claim 1, wherein the cooling particles are produced by spray drying, spray granulation, melt granulation, coacervation, coagulation, extrusion, melt extrusion, or a coating process.

4. The cooling particles of claim 1, wherein the N-ethyl-2-isopropyl-5-methyl-cyclohexanecarboxamide is present in the solvent component (A).

5. The cooling particles of claim 4, wherein the N-ethyl-2-isopropyl-5-methyl-cyclohexanecarboxamide is (1R,2S,5R)-N-ethyl-2-isopropyl-5-methyl-cyclohexanecarboxamide.

6. The cooling particles of claim 1, wherein the medium-chain triglycerides are present in the solvent component (A).

7. The cooling particles of claim 1, wherein the 2-hydroxypropyl (2-isopropyl-5-methyl-cyclohexyl) carbonate is present in the solvent component (A) as 2-hydroxypropyl [(1R,2S,5R)-2-isopropyl-5-methyl-cyclohexyl] carbonate.

8. The cooling particles of claim 1, wherein the (2-isopropyl-5-methyl-cyclohexyl) 2-hydroxypropanoate is present in the solvent component (A) as [(1R,2S,5R)-2-isopropyl-5-methyl-cyclohexyl] (2S)-2-hydroxypropanoate.

9. The cooling particles of claim 1 comprising:
   (I) 5 to 40% by weight, based on a total weight of the cooling particles, of a cooling composition, the cooling composition comprising:

(A) 80 to 99% by weight, based on a total weight of the cooling composition, of a solvent component consisting of comprising:
  (i) 2-hydroxypropyl [(1R,2S,5R)-2-isopropyl-5-methyl-cyclohexyl] carbonate and/or 2-hydroxypropyl [(1R,2S,5R)-2-isopropyl-5-methyl-cyclohexyl] carbonate;
  (ii) (1R,2S,5R)-N-ethyl-2-isopropyl-5-methyl-cyclohexanecarboxamide; and
  (iii) optionally, 0.5 to 8% by weight, based on a total weight of the solvent component, of medium-chain triglycerides; and
(B) 1.5 to 12% by weight, based on a total weight of the cooling composition, of a cooling agent that is (1R,2S,5R)-N-(4-methoxyphenyl)-5-methyl-2-(1-methylethyl)-cyclohexane-carboxamide,
  wherein the cooling agent (B) is dissolved in the solvent component (A) at room temperature; and
(II) a matrix material that encapsulates the cooling composition (I) of (I) (A),
  wherein the particles have an average particle diameter D50 of 10 to 2000 μm as determined by laser light diffraction according to ISO ISO13320:2009-10.

10. The cooling particles of claim 9, wherein the medium-chain triglycerides are present in solvent component (A).

11. The cooling particles of claim 10, wherein the medium-chain triglycerides are present in an amount of 4 to 7.5% by weight, based on the total weight of the solvent component (A).

12. Cooling particles comprising:
(I) 10 to 30% by weight, based on a total weight of the cooling particles, of a cooling composition, the cooling composition comprising:
  (A) 80 to 99% by weight, based on a total weight of the cooling composition, of a solvent component comprising:
    (i) 2 to 20% by weight, based on a total weight of the solvent component, of 2-hydroxypropyl (2-isopropyl-5-methyl-cyclohexyl) carbonate;
    (ii) 55 to 75% by weight, based on the total weight of the solvent component, of (2-isopropyl-5-methyl-cyclohexyl) 2-hydroxypropanoate; and
    (iii) 15 to 35% by weight, based on the total weight of the solvent component, of N-ethyl-2-isopropyl-5-methyl-cyclohexanecarboxamide; and
  (B) 1 to 10% by weight, based on the total weight of the cooling composition, of a cooling agent that is (1R,2S,5R)-N-(4-methoxyphenyl)-5-methyl-2-(1-methylethyl)-cyclohexane-carboxamide; and
(II) a matrix material that encapsulates the cooling composition (I),
  wherein the cooling agent (B) is dissolved in the solvent component (A) at room temperature, and
  the particles have an average particle diameter D50 of 10 to 2000 μm as determined by laser light diffraction according to ISO ISO13320:2009-10.

13. The cooling particles of claim 12, wherein the solvent component (A) further comprises 0.5 to 8% by weight, based on the total weight of the solvent component (A), of medium-chain triglycerides.

14. The cooling particles of claim 13, wherein the medium-chain triglycerides are present in an amount of 4 to 7.5% by weight, based on the total weight of the solvent component (A).

15. The cooling particles of claim 12, wherein the solvent component (A) comprises:
  (i) 4 to 15% by weight, based on a total weight of the solvent component, of 2-hydroxypropyl (2-isopropyl-5-methyl-cyclohexyl) carbonate;
  (ii) 60 to 70% by weight, based on a total weight of the solvent component, of (2-isopropyl-5-methyl-cyclohexyl) 2-hydroxypropanoate; and
  (iii) 20 to 30% by weight, based on a total weight of the solvent component, of N-ethyl-2-isopropyl-5-methyl-cyclohexanecarboxamide.

16. The cooling particles of claim 15, wherein the solvent component (A) further comprises 0.5 to 8% by weight, based on the total weight of the solvent component (A), of medium-chain triglycerides.

17. The cooling particles of claim 12, wherein the solvent component (A) comprises:
  (i) 6.44 to 11.8% by weight, based on a total weight of the solvent component, of 2-hydroxypropyl (2-isopropyl-5-methyl-cyclohexyl) carbonate;
  (ii) 63 to 67% by weight, based on a total weight of the solvent component, of (2-isopropyl-5-methyl-cyclohexyl) 2-hydroxypropanoate; and
  (iii) 23 to 27% by weight, based on a total weight of the solvent component, of N-ethyl-2-isopropyl-5-methyl-cyclohexanecarboxamide.

18. The cooling particles of claim 17, wherein the solvent component (A) further comprises 0.5 to 8% by weight, based on the total weight of the solvent component (A), of medium-chain triglycerides.

19. Cooling particles comprising:
(I) 10 to 30% by weight, based on a total weight of the cooling particles, of a cooling composition, the cooling composition comprising:
  (A) 80 to 99% by weight, based on a total weight of the cooling composition, of a solvent component comprising:
    (i) 4 to 15% by weight, based on a total weight of the solvent component, of 2-hydroxypropyl [(1R,2S,5R)-2-isopropyl-5-methyl-cyclohexyl] carbonate;
    (ii) 60 to 70% by weight, based on the total weight of the solvent component, of [(1R,2S,5R)-2-isopropyl-5-methyl-cyclohexyl] (2S)-2-hydroxypropanoate;
    (iii) 20 to 30% by weight, based on the total weight of the solvent component, of (1R,2S,5R)-N-ethyl-2-isopropyl-5-methyl-cyclohexanecarboxamide; and
    (iv) optionally, 0.5 to 8% by weight, based on the total weight of the solvent component, of medium-chain triglycerides;
  (B) 1 to 10% by weight, based on a total weight of the cooling composition, of a cooling agent that is (1R,2S,5R)-N-(4-methoxyphenyl)-5-methyl-2-(1-methylethyl)-cyclohexane-carboxamide; and
(II) a matrix material that encapsulates the cooling composition (I),
  wherein the cooling agent (B) is dissolved in the solvent component (A) at room temperature, and
  the particles have an average particle diameter D50 of 10 to 2000 μm as determined by laser light diffraction according to ISO ISO13320:2009-10.

20. The cooling particles of claim 15, wherein the medium-chain triglycerides are present in the solvent component (A).

* * * * *